3,411,580
MUD REMOVAL METHOD
Oscar B. McKinney and Charles E. Roberts, Arlington, Tex., assignors to Byron Jackson, Inc., Long Beach, Calif., a corporation of Delaware
No Drawing. Filed Sept. 28, 1966, Ser. No. 582,528
11 Claims. (Cl. 166—22)

ABSTRACT OF THE DISCLOSURE

A method of displacing drilling mud in a well having a pipe, such as well casing, extending longitudinally therein and forming an annulus between the pipe and the wall of the well. A preflush fluid is prepared, the fluid including water, a polysaccharide, and a cross-linking agent, such as boric acid, for the polysaccharide. The preflush fluid is circulated into contact with drilling mud in the well, and the circulation is continued to displace the drilling mud from the well. Thereafter, cement slurry may be circulated into the annulus behind the preflush fluid and maintained in a quiescent condition in the annulus until it has set to bond the pipe to the wall of the well.

---

This invention relates to well treatment, and more particularly to the removal of drilling mud preparatory to a cementing operation, and to other well bore conditioning operations wherein the removal of drilling fluids is advantageous and desirable. More particularly, this invention relates to a well treating method employing a viscous fluid for the removal of drilling mud and like substances from the well.

In the oil industry, the invention is employed, for example, in connection with the cementing of casing and liners in wells drilled with muds.

In cementing operations performed in wells where drilling fluids are contacted by a cement slurry, it is not unusual for the cement to channel and/or become mixed with the drilling fluid resulting in low strength cement and an incomplete cement sheath around the casing. These conditions may result in fluids communicating between zones penetrated by the well, and secondary treatments performed to the well being ineffective due to channeling into non-productive zones. Those skilled in the art of fracturing and acidizing know the significance of having a complete high strength cement sheath around the casing, the cement sheath adhering to both casing and formation to prevent communication of treating fluids into non-productive zones.

Many mud removal fluids and treatment methods have been heretofore proposed with varying degrees of success for the removal of drilling fluids preparatory to cementing well pipe in oil wells and the like. These mud removal fluids have been called preflushes in the oil industry. It has been common practice to use preflushes designed to reduce the viscosity of the drilling fluid by volume dilution and/or with chemical dispersers and cause the drilling fluid to flow in a turbulent state at lower velocities than if the viscosity of the drilling fluid had not been reduced. No steps have been taken in these techniques to prevent either the preflush from mixing with the drilling fluid and/or the cement slurry. It is commonly understood that when a cement slurry is mixed with drilling fluid the resulting set cement and drilling fluid mixture will have lower compressive and tensile strengths than set cement formed from the cement slurry alone. It is also commonly understood that thin fluids will readily channel through a more viscous fluid. In the drilling of wells, hole enlargements often result due to the properties of the formations encountered during the drilling operation. In the common technique heretofore employed, thin preflushes do not effectively remove drilling fluids from enlarged sections because the preflush channels through the more viscouse drilling fluid.

In particular, there is a need for a more effective preflush and, more specifically, for a preflush fluid that will effectively remove drilling fluid at various flow conditions and physical configurations of the well containing the drilling fluid.

One object of the present invention is to provide an improved preflushing process for the removal of drilling mud in advance of the introduction of cement slurry into a well to cement pipe therein. Another object of the invention is to provide an improved method of displacing drilling mud from wells. A further object of the invention is to provide a preflushing method employing a preflush fluid that forms a viscous film between the drilling mud and the preflush, and a second viscous film between the preflush and the cement slurry. Another object is to provide a preflushing method using a fluid that contains a wetting agent for better cement bonding to the casing and/or the formation face. Another object is to provide a method that will scour and/or erode the drilling mud filter cake from the formation face allowing the cement slurry to contact the formation face. Another object is to provide a method utilizing a preflushing fluid that has a low fluid loss and will not be lost to permeable formations, i.e., the preflush will be contained in the annulus between the well pipe and the well bore and not be lost to the formations.

The viscous film that is formed between the drilling mud and the preflush, and between the preflush and the cement slurry conforms to the physical configuration of the well and removes drilling fluids from enlarged sections. These viscous films will work effectively over a wide range of flow conditions. In accordance with a preferred method, chemicals, such as wetting agents, are added to the preflush to preferentially water-wet both the casing and the formation for better cement bonding.

In brief, the present invention resides in a method of displacing drilling mud in a well having a pipe extending longitudinally therein providing an annulus between the pipe and the wall of the well, which method includes preparing a preflush fluid including water, a polysaccharide, and a cross-linking agent for the polysaccharide; circulating the preflush fluid into contact with drilling mud in the well; and continuing to circulate the preflush fluid to displace the drilling mud in the well. The preflush fluid may also include a flocculating agent for clay contained in the drilling mud, a wetting agent, a low fluid loss agent, or a combination of any two or all three of such agents. These materials, especially the clay flocculating agent, cause a viscous film or layer to form in a limited zone between the drilling mud and the preflush fluid, or in a limited zone between the preflush fluid and a body of cement slurry. Such viscous films or layers are highly effective in preventing substantial intermixing of the drilling mud and the preflush fluid, and of the preflush fluid and the cement slurry, upon pumping the fluids in the well.

If desired, various other agents and ingredients may be included in the preflush. For example, a bactericide may be included to kill any harmful bacteria present. Also, an agent may be included to act as an oxygen or other harmful corrosive gas scavenger. Further, it may be desirable to include corrosion inhibiting agents to reduce or prevent corrosion of metal parts contacted by the preflush. Also, weighting material may be added to adjust the density of the preflush.

The thickening agent found to be both effective and economical is a polysaccharide plus a cross-linking agent. The selection of a polysaccharide is meant in no way to be a limitation, but rather to be an illustration, as there are many thickening agents for water. The polysaccharides from which the viscous preflush fluid employed in the process of the invention are prepared are glycans containing monosaccharide units having adjacent cis-hydroxyl groups attached to the sugar ring structure. Such groups, unlike hydroxyl groups adjacent to one another in the trans position, are highly susceptible to oxidation and undergo extensive complex forming and cross-linking reactions with a variety of polyvalent cation cross-linking agents. These reactions permit the ready formation of polysaccharide preflush fluids of the type utilized in accordance with the invention. Monosaccharide units having adjacent cis-hydroxyl groups include D-mannose, D-mannuronic acid and D-mannopyranose. Glycans containing such units may be homoglycans or heteroglycans. Typical homoglycans include 1,4'-D-mannose linear polysaccharides such as ivory nut mannan, wood mannan and salep mannan; 1,4'-D-mannuronic acid linear polysaccharides such as alginic acid; 1,2',1,3'- and 1,6'-D-mannose branched chain polysaccharides such as yeast mannan; 1,4'-D-mannose branched chain polysaccharides such as the mannon of *Porphyra umbilicalis;* and other D-mannose polysaccharides such as mannocarolose. Heteroglycans containing adjacent cis-hydroxyl groups include 1,4'- and 1,6'-D-galactose and D-mannose polysaccharide such as guaran and locust bean gum; glucomannans such as those obtained from Amorphophallus and *Aloe versa;* galactomannans such as those obtained from the endosperms of the honey locust, flame tree, Kentucky coffee bean, paloverde, tara, lucerne, huizache and *Sophora japonica;* D-arabinose and D-mannose polysaccharides; D-glucose, D-mannose and D-galactose polysaccharides; and D-galactose, D-mannose and N-acetyl-D-glucosamine polysaccharides. It will be understood that all of the above named materials are not equally effective for purposes of the invention and that certain materials will be preferred over others.

Preferred polysaccharides for use in the process of the invention include the galactomannans derived from vegetable sources. Upon hydrolysis these materials yield the two simple sugars, mannose and galactose. Analyses have indicated them to be long chain polymers of D-mannopyranose units linked at the beta-1,4- positions and having D-galactopyranose units located as chains on the molecule. The D-galactopyranose units are connected to the $C_6$ atoms of the D-mannose units which make up the main structural framework. The ratio of D-galactose to D-mannose in the galactomannans varies from about 1:1.2 to about 1:2, depending upon the particular vegetable source from which it is obtained. In all cases, however, the mannose residues have cis-hydroxyl groups at the $C_2$ and $C_3$ positions, accounting for the properties of the galactomannans that make them useful for purposes of the present invention.

In recent years, guar seeds cultivated in the southwestern section of the United States have provided much of the galactomannan marketed commercially. Because the guar seed product is available from a number of commercial sources at relatively low cost, galactomannan derived from this source is particularly preferred for purposes of the invention; such product is know as guar gum.

Polysaccharides made up of monosaccharide units having adjacent cis-hydroxyl groups form viscous, colloidal solutions when hydrated in water. The viscosities obtained depend upon the hydration time, the temperature of the solution, the concentration of polysaccharide in the solution, the pH, the ionic strength of the solution, and the type of agitation employed. The galactomannan and similar polysaccharides utilized in accordance with the invention are compatible with sodium chloride and similar salts over a wide range of concentrations and hence naturally-occurring brines can be used in place of ordinary water for preparing the colloidal solution employed in the process of the invention.

Since aqueous solutions of polysaccharides will decrease in viscosity with time and increasing temperature because of fermentation and enzymatic hydrolysis, the solution can be stabilized by (1) increasing the pH of the solution and (2) adding organic preservatives. A small amount of sodium hydroxide is effective in increasing the pH to stabilize the mixture. Some suitable organic preservatives are formaldehyde, chlorinated phenolic compounds, phenylmercuric acetate, benzoic acid and sorbic acid.

Increased viscosity can be obtained from aqueous solutions of galactomannan and other polysaccharides containing adjacent cis-hydroxyl groups by employing a cross-linking agent. Materials which may be used include calcium chloride, calcium citrate, lead acetate, basic lead acetate, aluminum sulfate, borax, boric acid, and compounds which in solution yield borate ions. Some of these polyvalent cross-linking agents are sensitive to the pH of the solution, however, and if the pH is too high or too low may result in the formation of a precipitate.

Most drilling muds contain montmorillonite clay. This clay can be flocculated by adding such materials as sodium compounds, calcium compounds and other compounds that yield cations in aqueous solutions. In accordance with the invention, it has been found that calcium chloride which is readily available and economical is most efficient for flocculating clays. The choice of calcium chloride is meant as an example and not as a limitation.

When the clays, such as montmorillonite clay, in drilling mud are flocculated by calcium chloride in an aqueous solution of a polysaccharide, a highly viscous fluid film is formed in a narrow zone at the interface between the drilling mud and the aqueous solution. Even though this film has an apparently high viscosity, it is highly thixotropic.

There are many wetting agents useful in the practice of the invention. Most surface active agents used in the soap industry are effective in water-wetting surfaces whenever the chemicals are in an aqueous solution. Preferred wetting agents employed in performing the invention are the products formed by reaction under heat and pressure of octyl phenol or nonyl phenol with ethylene oxide. The proportions of the reactants are: one mole of octyl phenol or nonyl phenol to from 4 to about 17 moles of ethylene oxide, preferably about 10 moles of ethylene oxide. The reaction products are water-soluble wetting agents that remove oil films from the well pipe and the well walls and disperse the oil in the preflush fluid, thereby providing oil-free surfaces with which the cement will form a good bond. One such wetting agent that is efficacious for present purposes is the product produced by the reaction of one mole of octyl phenol with 10 moles of ethylene oxide, such product being sold under the trademark NOPCO PE 90 by NOPCO Chemical Company.

Without limitation, other suitable wetting agents are:

Sodium methyloleoyl taurate.
Sodium dioethyl sulfosuccinate.
Modified coconut fatty acid alkylolamide.
Propylated napththalene sulfonic acid, sodium salt.
Di[2-ethylhexyl] ester of sodium sulfosuccinic acid.

There is a variety of low fluid loss materials that may be incorporated in preflush fluids used in the practice of this invention. These materials are in the form of finely divided, solid particles that provide a coating on the more or less permeable earth formation defining the well bore; this coating minimizes or prevents the preflush from entering the pores of the formation and thus being lost from the well. A preferred low fluid loss material is silica flour, particularly silica flour having a particle size of minus 200 mesh, U.S. Sieve Series. Other finely divided particulate materials useful in this invention as low fluid loss agents are gilsonite, barite, talc, and the like, preferably of a particle size of from minus 150 mesh to minus 250 mesh, U.S. Sieve Series.

EXAMPLE I

In accordance with a preferred formulation, the preflush fluid contains the following ingredients in the amounts indicated:

Water—960 gallons.
Guar gum—50 lbs.
Calcium chloride—80 lbs.
Boric acid—30 lbs.
Reaction product of one mole of octyl phenol with 10 moles of ethylene oxide—5 gallons.
Silica flour (—200 mesh)—400 lbs.

The preflush fluid is prepared by placing the water in a mixing tank. The water is agitated, and the guar gum is slowly added to it. The agitation of the mixture is continued until the guar gum hydrates, which generally requires 10 to 15 minutes at a temperature of about 70° F. The silica flour is then added and the mixture is agitated until it is uniform. Thereafter, the calcium chloride is added and agitation is continued until the mixture is again uniform. Then the boric acid is added under continued agitation. Finally the reaction product is added and agitation is continued for from 5 to 10 minutes. The order of mixing the ingredients is not critical, but the guar gum should be added and allowed to hydrate before the boric acid is added. Thus, 1,000 gallons of preflush fluid are prepared. Larger or smaller quantities are similarly prepared by varying the amounts of the ingredients used, while maintaining the relative proportions indicated.

The proportions of the ingredients stated in Example I may be varied without departing from the invention. On the basis of 960 gallons of water, the amounts of the other components of the preflush liquid may, for practical purposes, fall within the following ranges:

Galactomannan (i.e. guar gum)—10 lbs. to 200 lbs.
Cross-linking agent (i.e. boric acid)—5 lbs. to 60 lbs.
Clay flocculating agent (i.e. calcium chloride)—20 lbs. to 400 lbs.
Wetting agent (i.e. reaction product of 1 mole of octyl phenol with 10 moles of ethylene oxide)—2 gals. to 12 gals.
Low water loss material (i.e. silica flour)—10 lbs. to 1,000 lbs.

In general, the larger the quantity of the galactomannan that is used, the larger must be the amount of the cross-linking agent.

In California, a well was drilled with a 12¼″ bit to a depth of 980 ft. Casing, having a diameter of 9⅝″ was set in the well, the casing extending from the surface of the earth to within a few feet of the bottom of the well. The casing was open at the bottom and connected at the top to pumping equipment. The well and the bore of the casing contained drilling mud, weighing 69 lbs. per cubic foot, extending from the bottom of the well to the surface of the earth.

Five hundred gallons of preflush fluid were prepared in accordance with Example I. This volume of preflush fluid was pumped into the top of the casing and into direct contact with the top of the column of drilling mud in the casing. As the preflush fluid was pumped down the casing it displaced the drilling mud, forcing it down the casing and up the annulus between the casing and the wall of the well and discharging some of it from the top of the annulus.

It was calculated that 2,400 gallons of cement would be required to fill the annulus between the casing and the wall of the well. This quantity of cement slurry plus a small excess was mixed and pumped into the top of the casing and into contact with the top of the preflush fluid standing in the casing. Pumping was continued to displace the fluids down the casing, up the annulus, and out of the top of the annulus. When all of the cement slurry had been pumped into the top of the casing, a displacement fluid was pumped into the top of the casing to force all of the cement slurry from the casing into the annulus to fill the annulus with cement slurry, displacing the remainder of the drilling mud and the preflush fluid from the well through the top of the annulus. Pumping was then stopped, and the cement slurry was permitted to set, thereby cementing the casing to the wall of the well. A very clean separation of the drilling mud from the preflush fluid was noted as the fluids issued from the top of the annulus. There was also observed a clean separation of the preflush fluid from the cement slurry as the interface of those two liquids appeared at the top of the annulus. After the cement slurry had set, a cement bond log was run which revealed an excellent bond between the casing and the surrounding cement sheath for the full length of the casing.

The foregoing cementing operation is merely illustrative of one manipulative procedure involving displacement of drilling mud from a well using a preflush fluid in accordance with the invention. The drilling mud to be removed may be fresh, or it may have stood in the well for a number of years. Displacement of the drilling mud may be effected for purposes other than the cementing of casing in the well. For example, the invention may be practiced where it is desired to remove pipe from a well, the pipe being embedded and stuck in drilling mud in the well.

Depending upon numerous considerations, such as the condition of the well and the pipe therein, the composition of the drilling mud in the well, and the composition of the cement slurry, if used, one or more of the ingredients, other than the water and the galactomannan, may be omitted from the preflush typified by Example I. Thus, if the drilling mud, such as some oil-base muds, contains no clay to be flocculated, the calcium chloride may be dispensed with. If the well wall and casing are free from oil films, it is generally not necessary to include a wetting agent. Where the earth formations that are traversed by the well are relatively impermeable, and serious loss of fluid is not expected, no silica flour, or other fluid loss material, need be used.

Even the cross-linking agent may be eliminated under certain circumstances. If the drilling mud itself contains a sufficient concentration of cross-linking agent, the cross-linking agent in the drilling mud will react with the guar gum or the like contained in the preflush liquid to cross-link the guar gum and form the thick, viscous, thixotropic layer in the zone where the mud and preflush come together and intermix. Where, as is frequently the case, the drilling mud does contain an effective concentration of a cross-linking agent, no cross-linking agent is required in the preflush fluid.

Similarly, cement slurries usually contain cross-linking agents in sufficient concentration to cross-link the guar gum in the limited zone in which the cement slurry mixes with the preflush fluid. This is especially true with respect to the commonly used slurries of portland cement, which are alkaline and contain ionized calcium salts. Thus, it may not be necessary to include a cross-linking agent in the preflush for the sole purpose of forming a viscous, thixotropic fluid layer between the preflush and the cement slurry.

EXAMPLE II

A preflush fluid is prepared by slowly adding 160 lbs. of powdered guar gum to 1,000 gallons of water in a mixing tank. The liquid is continuously stirred as the guar gum is being added. After all the guar gum has been added, agitation of the liquid is continued for a time sufficient to permit the guar gum to become hydrated, which takes from 10 minutes to 30 minutes. There is thus formed a thick solution of guar gum in water, the solution being suitable for carrying out mud displacement operations is accordance with the invention. This preflush is especially useful in situations in which the mud itself contains the necessary cross-linking agent and is free from flocculatable clay, in which there is no need to remove

We claim:

1. A method of cementing a well having a pipe extending longitudinally therein providing an annulus between the pipe and the wall of the well, said well containing a column of drilling mud, which comprises:
   (a) preparing a preflush fluid including water, a polysaccharide, and a cross-linking agent for the polysaccharide;
   (b) pumping said preflush fluid down said pipe and into contact with the drilling mud;
   (c) pumping a cement slurry down said pipe and into contact with said preflush fluid;
   (d) continuing to pump fluid down said pipe to displace said column of drilling mud up the annulus and to place said cement slurry between the pipe and the wall of the well;
   (e) discontinuing said pumping; and
   (f) allowing said cement slurry to set.

2. A method of displacing drilling mud in a well having a pipe extending longitudinally therein providing an annulus between the pipe and the wall of the well, which method comprises:
   (a) preparing a preflush fluid including water, a polysaccharide, and a cross-linking agent for the polysaccharide;
   (b) circulating said preflush fluid into contact with drilling mud in the well; and
   (c) continuing to circulate said preflush fluid to displace the drilling mud in the well.

3. A method as defined in claim 2 wherein said polysaccharide is a galactomannan derived from a vegetable source.

4. A method as defined in claim 2 wherein said polysaccharide is a galactomannan derived from guar seed.

5. A method as defined in claim 2 wherein said preflush fluid also includes a clay flocculating agent.

6. A method as defined in claim 2 wherein said preflush fluid also includes a clay flocculating agent and a wetting agent.

7. A method of displacing drilling mud in a well having a pipe extending longitudinally therein providing an annulus between the pipe and the wall of the well, which method comprises:
   (a) preparing a preflush fluid including water, a polysaccharide, a cross-linking agent for the polysaccharide, a clay flocculating agent, a wetting agent, and a low fluid loss material;
   (b) circulating said preflush fluid into contact with drilling mud in the well; and
   (c) continuing to circulate said preflush fluid to displace the drilling mud in the well.

8. A method of displacing drilling mud in a well having a pipe extending longitudinally therein providing an annulus between the pipe and the wall of the well, which method comprises:
   (a) preparing a preflush fluid including water, galactomannan derived from guar seed, boric acid, calcium chloride, a surface active wetting agent, and silica flour;
   (b) circulating said preflush fluid into contact with drilling mud in the well; and
   (c) continuing to circulate said preflush fluid to displace the drilling mud in the well.

9. A method of displacing drilling mud in a well having a pipe extending longitudinally therein providing an annulus between the pipe and the wall of the well, which method comprises:
   (a) preparing a preflush fluid including, in substantially the following proportions, 960 gallons of water, from about 10 pounds to about 200 pounds of guar gum, from about 5 pounds to about 60 pounds of a cross-linking agent for the guar gum, from about 20 pounds to about 400 pounds of calcium chloride, from about 2 gallons to about 12 gallons of surface active wetting agent, and from about 10 pounds to about 1,000 pounds of a low fluid loss material;
   (b) circulating said preflush fluid into contact with drilling mud in the well; and
   (c) continuing to circulate said preflush fluid to displace the drilling mud in the well.

10. A method of displacing drilling mud in a well having a pipe extending longitudinally therein providing an annulus between the pipe and the wall of the well, which method comprises:
    (a) preparing a preflush fluid including, in substantially the following proportions, 960 gallons of water, 50 pounds of guar gum, 30 pounds of boric acid, 80 pounds of calcium chloride, 5 gallons of surface active wetting agent, and 400 pounds of silica flour having a particle size of minus 200 mesh, U.S. Sieve Series;
    (b) circulating said preflush fluid into contact with drilling mud in the well; and
    (c) continuing to circulate said preflush fluid to displace the drilling mud in the well.

11. A method of displacing drilling mud in a well having a pipe extending longitudinally therein providing an annulus between the pipe and the wall of the well, which method comprises:
    (a) preparing a preflush fluid including, in substantially the following proportions, 960 gallons of water, from about 10 pounds to about 200 pounds of galactomannan, from about 5 pounds to about 60 pounds of a cross-linking agent for the galactomannan, from about 20 pounds to about 400 pounds of clay flocculating agent, from about 2 gallons to about 12 gallons of surface active wetting agent, and from about 10 pounds to about 1,000 pounds of a low fluid loss material;
    (b) circulating said preflush fluid into contact with drilling mud in the well; and
    (c) continuing to circulate said preflush fluid to displace the drilling mud in the well.

References Cited

UNITED STATES PATENTS

| | | | |
|---|---|---|---|
| 2,322,484 | 6/1943 | Stuart | 166—44 X |
| 3,215,634 | 11/1965 | Walker | 166—42 X |
| 3,291,211 | 12/1966 | Savins et al. | 166—22 |
| 3,319,715 | 5/1967 | Parks | 175—65 X |

CHARLES E. O'CONNELL, *Primary Examiner.*

STEPHEN J. NOVOSAD, *Assistant Examiner.*